United States Patent [19]
Marinus et al.

[11] Patent Number: 5,689,407
[45] Date of Patent: Nov. 18, 1997

[54] SWITCHED-MODE POWER SUPPLY

[75] Inventors: Antonius A. M. Marinus; Guy L. P. De Bondt; Patrick E. G. Smeets, all of Eindhoven, Netherlands

[73] Assignee: U.S. Philips Corporation, New York, N.Y.

[21] Appl. No.: 626,528

[22] Filed: Apr. 2, 1996

[30]     Foreign Application Priority Data

Apr. 5, 1995 [EP] European Pat. Off. .............. 95200860
Feb. 5, 1996 [EP] European Pat. Off. .............. 96200248

[51] Int. Cl.[6] ................................................ H02M 3/335
[52] U.S. Cl. .................... 363/21; 363/49; 363/97
[58] Field of Search ............................ 363/15, 18, 19, 363/20, 21, 49, 97, 131

[56]                References Cited

U.S. PATENT DOCUMENTS

| | | | |
|---|---|---|---|
| 4,688,159 | 8/1987 | Marinus | 363/21 |
| 4,766,528 | 8/1988 | Marinus | 363/21 |
| 5,341,279 | 8/1994 | Yamada | 363/21 |
| 5,351,177 | 9/1994 | Megeid | 363/21 |
| 5,581,453 | 12/1996 | Ueta et al. | 363/49 |

OTHER PUBLICATIONS

Motorola Semiconductor Technical Data—No. MC44603, Jun. 6, 1994.

*Primary Examiner*—Peter S. Wong
*Assistant Examiner*—Y. J. Han
*Attorney, Agent, or Firm*—Edward W. Goodman

[57] ABSTRACT

In a standby mode, a switched-mode power supply circuit may be operated in a burst mode with reduced secondary voltages (Vo1, Vo2) for supplying a standby voltage (Vo1) at a very high efficiency. In a normal operating mode of the power supply, a control circuit (1) is maintained in its on-state by a power supply voltage (Vcc) generated by the power supply. The control circuit (1) supplies control pulses (Vd) for switching the power supply. The burst mode is obtained by decreasing the power supply voltage (Vcc) generated for the control circuit (1) to such an extent that, without any further provisions, the control circuit (1) reaches an off-state in which no control pulses (Vd) are generated. In the standby mode, the control circuit (1) is supplied with current by a power supply circuit (4). In the off-state, the control circuit (1) takes up a smaller power supply current (Icc) from the power supply circuit (4) than it is supplying and the power supply voltage (Vcc) increases until the control circuit (1) reaches the on-state and starts generating the control pulses (Vd). In the on-state, the control circuit (1) takes up a larger current from the power supply circuit (4) than it is supplying and the power supply voltage (Vcc) decreases until the control circuit (1) reaches the off-state again. In this way, the power supply, in the standby mode is each time active during first periods and inactive during second periods. To bring the power supply voltage to the standby mode, the power supply voltage (Vcc) generated for the control circuit (1) is decreased in such a way that also the secondary voltage (Vs1, Vs2) are decreased.

20 Claims, 9 Drawing Sheets

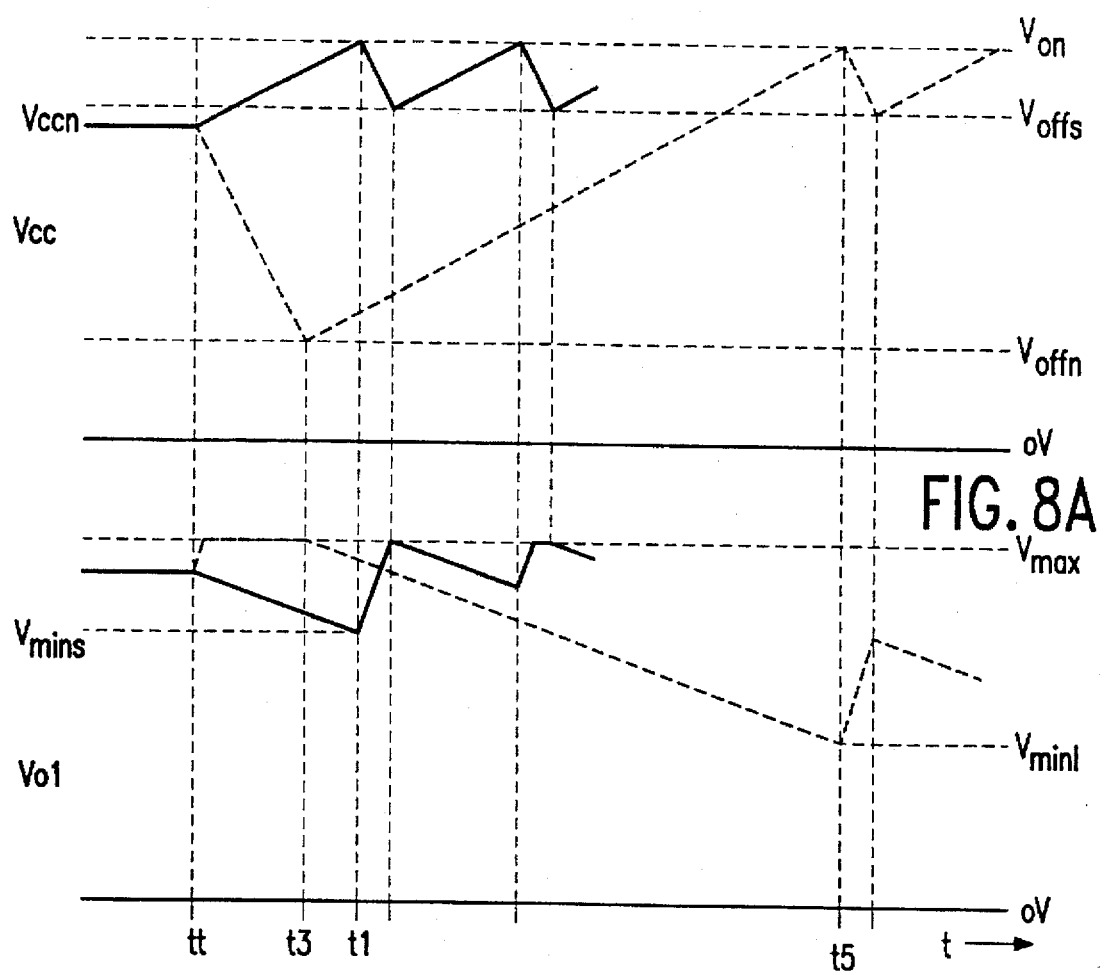
FIG. 8A
FIG. 8B
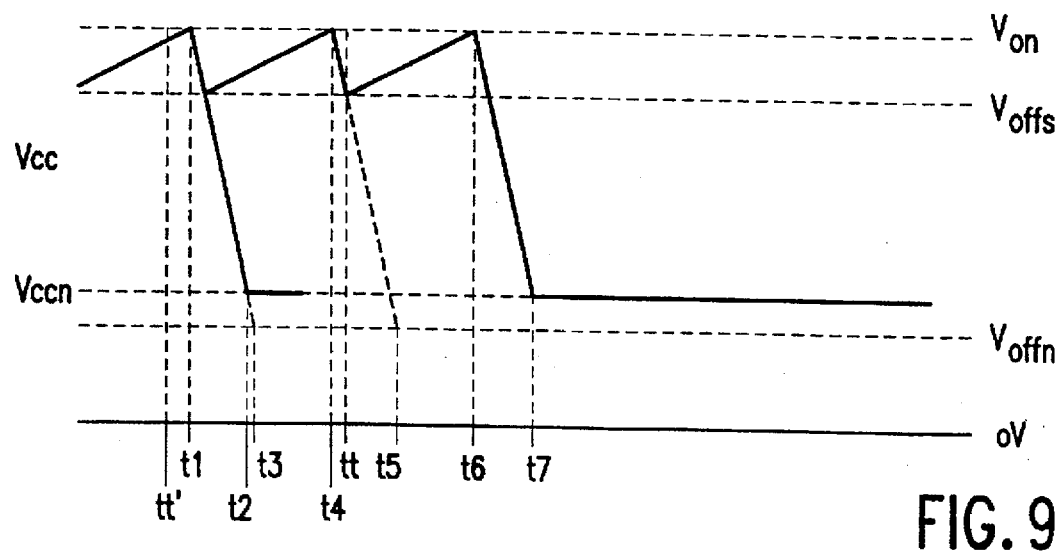
FIG. 9

SWITCHED-MODE POWER SUPPLY

BACKGROUND OF THE INVENTION

1. Field of the Invention

The invention relates to a switched-mode power supply circuit adapted to operate in a normal operating mode and a standby mode, this power supply circuit comprising: a switch, a control circuit for controlling the switch, the control circuit comprising voltage-detection means coupled to receive a power supply voltage, the voltage-detection means bringing the control circuit to an off-state if the power supply voltage has decreased to an off-level, and the voltage-detection means bringing the control circuit to an on-state if the power supply voltage has increased to a starting level, a transformer having a primary winding and being incorporated in a series arrangement with the switch, the series arrangement being coupled to a DC input voltage source, the transformer further having a power supply winding which is coupled to the voltage-detection means, the power supply winding supplying a take-over voltage in the normal operating mode at a value at which the control circuit is in the on-state, and power supply means coupled to the DC input voltage source for receiving an input current for applying a power supply current to the control circuit.

The invention also relates to a picture display apparatus provided with such a switched-mode power supply circuit. Such a switched-mode power supply circuit may be used, inter alia, in electronic apparatuses which may be in a normal operating state or in a standby state. In the standby state, these apparatuses consume a low power.

2. Description of The Related Art

Such a switched-mode power supply circuit (further referred to as power supply) is known from Motorola Semiconductor technical data "high flexibility green SMPS controller", in which an integrated circuit for controlling the power supply (further referred to as control circuit), having type number MC44603, is described. In the normal on-state (further referred to as operating mode), this known power supply generates a plurality of operating-output DC voltages (further referred to as operating voltages) applying a voltage to those circuits in an electronic apparatus which should be active in the operating mode. The known power supply further generates a standby output DC voltage (further referred to as standby voltage), both in the operating mode and in a standby mode for applying a voltage to those circuits which should be active in the standby mode.

The known power supply is provided with a transformer having a primary winding and a plurality of secondary windings. A first secondary winding supplies the standby voltage, both in the operating mode and in the standby mode. In the operating mode, an operating voltage from a second secondary winding is fed back to the control circuit via a feedback circuit. The control circuit controls on and off-times of a repetitive switching transistor which is arranged in series with the primary winding for stabilizing the operating voltage generated by the second secondary winding. The feedback circuit includes an optocoupler for transferring feedback information from the secondary side of the power supply to the primary side via a DC separation.

The control circuit brings the power supply to the standby mode if the peak current through the switching transistor has fallen below a given value, which is the case if the power consumption at the secondary side decreases considerably. The power consumption at the secondary side decreases considerably if the current taken from the operating voltage is reduced considerably by inactivating the circuit connected to the operating voltage or by decoupling this circuit from the operating voltage. The standby voltage is stabilized indirectly in the standby mode by stabilizing the operating voltage. To improve the efficiency of the power supply in the standby mode, in which the power supply supplies a small power, the switching transistor is switched at a lower frequency than in the operating mode.

The known power supply has the drawback that the efficiency in the standby mode is not so high as is desired and that special provisions are necessary for inactivating circuits connected to operating voltages in the standby mode, or for decoupling these circuits from these operating voltages.

SUMMARY OF THE INVENTION

It is an object of the invention to provide a switched-mode power supply circuit in which a standby voltage is generated in the standby mode in an inexpensive and more efficient way.

To this end, a first aspect of the invention provides a switched-mode power supply circuit of the type described in the opening paragraph, which is characterized in that the power supply circuit further comprises means for decreasing the take-over voltage in the standby mode and, in response to a standby mode indication signal, to a value at which the control circuit may be alternately in the on-state and in the off-state.

A second aspect of the invention provides a picture display apparatus provided with such a power supply circuit as described above.

In a switched-mode power supply circuit, according to the invention, the control circuit in the off-state draws a power supply current from the power supply means, this current being smaller than the input current, so that the power supply voltage increases to the starting level at which the control circuit changes to the on-state, and the control circuit in the on-state draws a power supply current from the power supply means, this current being larger than the input current, so that the power supply voltage decreases to a value at which the control circuit changes over to the off-state. The power supply thus operates, during the standby, mode in a burst mode in which, with periodical repetition, the switch is switched on and off during first periods and is not switched during second periods. During the first periods, the power supply is operative and the standby voltage increases, while during the second periods, the power supply is not operative and the standby voltage decreases due to the power consumption of the circuits connected to the standby voltage. The efficiency of a switched-mode power supply is particularly determined by switching losses, notably in the switch, in a clamp and in a dV/dT snubber. Since the power supply is switched only during the first (short) periods, the power supply losses are very low. Since, moreover, the take-over voltage in the standby mode (and consequently also other generated voltages, hence also the voltage across the primary winding in the case of an open switch) is decreased, the losses in the clamp and in the snubber will decrease to an extra considerable extent.

In the standby mode, the power supply according to the invention functions as follows. Let it be assumed that the control circuit is in the off-state. In the off-state, the control circuit does not generate control pulses so that the standby voltage decreases and, moreover, the control circuit draws a supply current from the power supply means, which current is smaller than the current received by the supply means, so that the power supply voltage increases. As soon as the power supply voltage reaches the starting level, the control circuit is brought to the operating mode and starts generating control pulses so that the standby voltage increases. Since the power supply current is now larger than the current received by the power supply means, the power supply voltage will decrease until the off-level is reached, at which the control circuit is brought to the off-state again, whereafter the power supply voltage starts increasing again until the starting level is reached, and the foregoing is repeated. A burst mode is realized at which the off-time of the power supply is determined by the time required to cause the power supply voltage to increase from the off-level to the on-level.

The power supply changes from the operating mode to the standby mode by decreasing the take-over voltage to below the off-level in response to a standby mode indication signal. Due to the decrease of the take-over voltage, the power supply voltage for the control circuit is only determined by the current received by the power supply means, the power supply current taken up by the control circuit, the off-level and the on-level. This decrease of the take-over voltage may be effected, for example, by acting on a feedback which, in the operating mode, feeds back one of the output DC voltages to the control circuit for stabilizing this output DC voltage, or by clamping (for example, by means of a second control loop) a secondary winding, which in the operating mode, supplies a higher voltage than the standby voltage, at a lower voltage (for example, at the standby voltage) in the standby mode.

Since the take-over voltage is decreased in the standby mode, other secondary windings will also supply a decreased output voltage and it is not necessary to take special measures for inactivating circuits connected to these output voltages or for decoupling these circuits from these output voltages.

A power supply is known from U.S. Pat. No. 4,766,528, which is provided with a transformer having a primary winding and a plurality of secondary windings and which in an operating mode generates a plurality of output voltages for supplying circuits in an electronic apparatus with a voltage. A first output voltage coming from a first secondary winding is fed back to a control circuit via a feedback circuit. The control circuit controls on and off-times of a switching transistor, which is arranged in series with the primary winding, for stabilizing the first output voltage. The feedback circuit includes an opto-coupler for transferring feedback information via a DC separation from the secondary side of the power supply to the primary side. The first secondary winding supplies the first output voltage to a first circuit which only needs to be active in the operating mode. A second secondary winding supplies a standby voltage for supplying a stabilized standby voltage via a stabilizer circuit to those circuits which should remain active in the standby mode. The power supply circuit is brought to the standby mode by closing a switch arranged between the second secondary winding and the feedback circuit. As a result of closing the switch, all secondary voltages decrease, and in the standby mode, all output voltages have a value which is considerably lower than in the operating mode. To prevent the stabilized standby voltage from decreasing due to the decrease of the standby voltage supplied by the second secondary winding, a further switch is arranged in series with a third secondary winding which supplies a higher voltage than the second secondary winding. By closing the further switch in the standby mode, the third secondary winding supplies the higher voltage to the stabilizer circuit.

To generate the small power to be supplied in the standby mode by the power supply known from U.S. Pat. No. 4,766,528 at a high efficiency, this power supply is operated in a burst mode: the power supply is alternately active during first, only short periods and inactive during second, long periods. In the active periods, the standby voltage increases until a maximally desired level is reached and a time-determining element, arranged between the standby voltage and the feedback circuit is activated. Via the feedback circuit, this time-determining element maintains the first switch open during the second, long periods. Consequently, the standby voltage decreases. After the long periods, the power supply becomes active again during the short periods until the maximally desired level is reached again. The time-determining element is only activated in the standby mode. This known power supply has the drawback that a separate time-determining element is to be arranged at the secondary side (i.e., the side DC separated from the line voltage) so as to be able to transfer the feedback information derived from the first voltage in the operating mode and the feedback information derived from the standby voltage in the standby mode through one (expensive) DC separated opto-coupler of the feedback circuit from the secondary to the primary side. Therefore, it is not possible to accommodate the time-determining element together with the control circuit in one integrated circuit (IC) at the primary side of the power supply. The switched-mode power supply according to the present invention is advantageously distinguished from the power supply known from U.S. Pat. No. 4,766,528 in that the time-determining element (for determining the off-time of the power supply in the standby mode) is not necessary. This is based on the recognition that this off-time can be realized by means of the control circuit according to the invention in an inexpensive way by causing the take-over voltage generated by the power supply to decrease to below an off-level.

In an embodiment of the switched-mode power supply circuit according to the invention, the standby voltage is supplied by the first secondary winding in the operating mode. In the standby mode, the voltage supplied by this first secondary winding is also decreased. This decreased voltage should still be sufficiently high to be usable as a standby voltage. This means that in the operating mode, the first secondary winding supplies a very high voltage. This high voltage results in a large dissipation in a stabilizing circuit which is coupled to the standby voltage for supplying a stabilized standby voltage. The large dissipation in the operating mode can be prevented by choosing the voltage generated by the first secondary winding in the operating mode to be slightly higher than the standby voltage. In the standby mode, another secondary winding is necessary, which supplies a voltage to be used as a standby voltage. This other secondary winding may be the second secondary winding which is coupled to the first secondary winding via connection means (for example, a unidirectional switch such as a thyristor).

In a further embodiment of the switched-mode power supply circuit according to the invention, the take-over voltage is decreased by decreasing the operating voltage. This can be realized in a simple manner by making use of the connection means, which are already present, and a clamping circuit which limits the standby voltage. The clamping circuit may consist of a zener diode connected to the standby voltage. By closing the connection means, the second secondary winding is connected to the standby voltage, and the second secondary voltage is decreased by limiting the standby voltage by means of the clamping circuit. Consequently, the takeover voltage is decreased and the power supply will start operating in the burst mode.

A further embodiment of the switched-mode power supply circuit according to the invention, has the advantage that the standby voltage does not exceed a given maximum level and the dissipation in the stabilizing circuit remains small in the standby mode. When the maximum level is reached, a feedback signal becomes active, with which the generation of control pulses is influenced for causing the standby voltage not to increase any further.

A further embodiment of the switched-mode power supply circuit according to the invention, has the advantage that an overvoltage safety circuit already present in the control circuit (integrated circuit) can be used for discontinuing the generation of control pulses as soon as the standby voltage has reached the maximum value. By discontinuing the generation of the control pulses, the standby voltage will decrease. In this way, the active period of the power supply is as short as possible.

A further embodiment of the switched-mode power supply circuit according to the invention, has the advantage that the ripple in the standby voltage is small. To this end, the active feedback signal acts on the control of the on and off-time of the switch when the maximum value of the standby voltage is reached for stabilizing the standby voltage until the power supply voltage of the control circuit has decreased to the off-level.

A further embodiment of the switched-mode power supply circuit according to the invention, provides a simple implementation of the power supply means. The voltage across the capacitor, which is the power supply voltage, is determined in the standby mode by a current supplied by the resistor to the capacitor and by the power supply current which is taken from the capacitor by the control circuit.

A further embodiment of the switched-mode power supply circuit according to the invention, has the advantage that the connection means may be inexpensive by keeping the current therethrough at a small value. The standby mode indication signal may occur at an arbitrary moment, and at this arbitrary moment, the current in the second secondary winding may be maximal (for example, 10 A, required for supplying a horizontal deflection circuit and for high-voltage generation). The current which must flow through the connection means to maintain the standby voltage is small (for example, 10 mA on avenge, required to feed a microcomputer). The means for limiting the current through the connection means prevents this large current from flowing through the connection means.

A further embodiment of the switched-mode power supply circuit according to the invention, has the advantage that the current through the connection means is limited in a very inexpensive manner.

A further embodiment of the switched-mode power supply circuit according to the invention, has the advantages that the current in the connection means is limited without extra dissipation and that the operating voltage is not increased by a voltage drop across a current-limiting means in series with the connection means. The standby mode indication signal activates an off-circuit for causing the generation of control pulses to stop, for example via the control input, or by activating the overvoltage detection. The power supply voltage of the control circuit starts to decrease again. If the off-level (or a level just above the off-level) is reached, soft-start means are brought to an initial state. When the off-level is reached, the control circuit is brought to the off-state and the power supply voltage starts to increase. When the starting level is reached, the control circuit starts to generate control pulses which, due to the soft-start means present in its initial state, result in a small peak current in the primary winding, and hence in the secondary winding. This small peak current is reached, for example, by maintaining the duty cycle of the control pulses small so that the switch is closed only for a short time. A very accurate limitation of the peak current is possible by controlling a variation of the duty cycle, dependent on a desired variation of the peak current in the primary winding.

In a further embodiment of the switched-mode power supply circuit according to the invention, the voltage detection means is adapted to obtain a difference between the starting level and the off-level which is smaller during the standby mode than during the normal operating mode. During the normal operating mode, a large difference between the starting level and the off-level is advantageous for at least the following reasons. The switched-mode power supply circuit changes from the standby mode to the normal operating mode by starting to generate control pulses and by enabling the take-over voltage to rise. On the one hand, the power supply voltage of the control circuit will decrease as the control circuit is in the on-state, and on the other hand, it will take some time before the power supply generates a take-over voltage above the off-level. So, if the off-level is chosen too high, the power supply voltage of the control circuit will reach the off-level before the take-over voltage has increased to above this off-level and as a result, the control circuit will enter the off-state. In this situation, the power supply needs several attempts to change from the standby mode to the normal operating mode, or even fails in this transition. Furthermore, tolerances and a ripple on the take-over voltage also necessitate a large enough difference between the starting level and the take-over level. The same reasoning holds for a first start up to normal operation. However, such a large difference causes a low repetition frequency of the bursts of control pulses during the standby mode. The standby voltage decreases in between these bursts. The ripple on the standby voltage can be kept small by connecting a large smoothing capacitor to the standby voltage. A smaller difference between the starting level and the off-level causes a higher repetition frequency of the bursts of control pulses. This gives rise to either a smaller ripple on the standby voltage, or it provides the possibility of using a smaller smoothing capacitor. The decrease of the difference between the starting level and the off-level may be initiated in response to the standby mode indication signal or a signal derived therefrom.

In a further embodiment of the switched-mode power supply circuit according to the invention, the control circuit is switched to the off-state as soon as a change of mode of the power supply occurs. The change of mode may be a transition from the standby mode to the normal operating mode, or the other way around. A change of mode may be indicated by the standby mode indication signal or a signal derived therefrom. In this way, it is possible to minimize a voltage dip on the standby voltage, as will be elucidated in FIGS. 7 and 8.

A further embodiment of the switched-mode power supply circuit according to the invention, has the advantage that an existing feedback path, bridging a barrier between the secondary and the primary side of the power supply, is also used to transfer a change of the standby mode indication signal. The existing feedback path may already be used to stabilize a secondary voltage.

In a further embodiment of the switched-mode power supply circuit according to the invention, the feedback path comprises an opto-coupler, and a change of the standby mode indication signal indicating a change from the normal operating mode into the standby mode causes an extra current through the opto-coupler.

A further embodiment of the switched-mode power supply circuit according to the invention, has the advantage that the peak current during the standby mode can be limited to prevent an annoying audible noise caused by the transformer. The level of admissible peak current during the standby mode can be chosen independently of the level of admissible peak current during the normal operating mode. It is also possible to activate the peak current limiting only during the standby mode.

These and other aspects of the invention will be apparent from and elucidated with reference to the embodiment described hereinafter.

BRIEF DESCRIPTION OF THE DRAWINGS

In the drawings:

FIGS. 8A and 8B show time diagrams to illustrate a transition of the power supply from the normal operating mode to the standby mode;

FIG. 9 shows a time diagram of the power supply voltage to illustrate a transition of the power supply from the standby mode to the normal operating mode.

DESCRIPTION OF THE PREFERRED EMBODIMENTS

Figure 1:
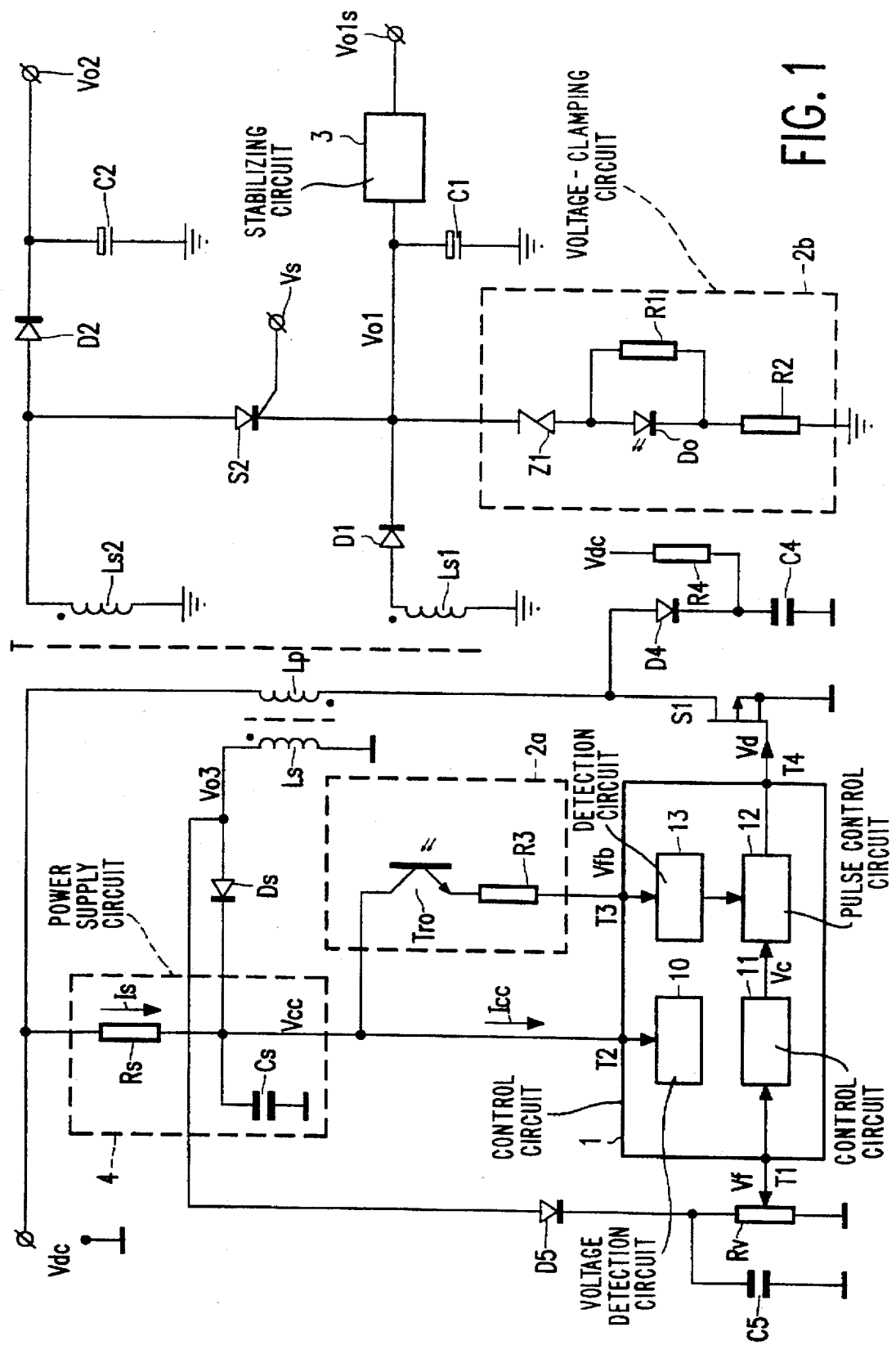
FIG. 1 shows an embodiment of the switched-mode power supply circuit according to the invention.
Figure 2:
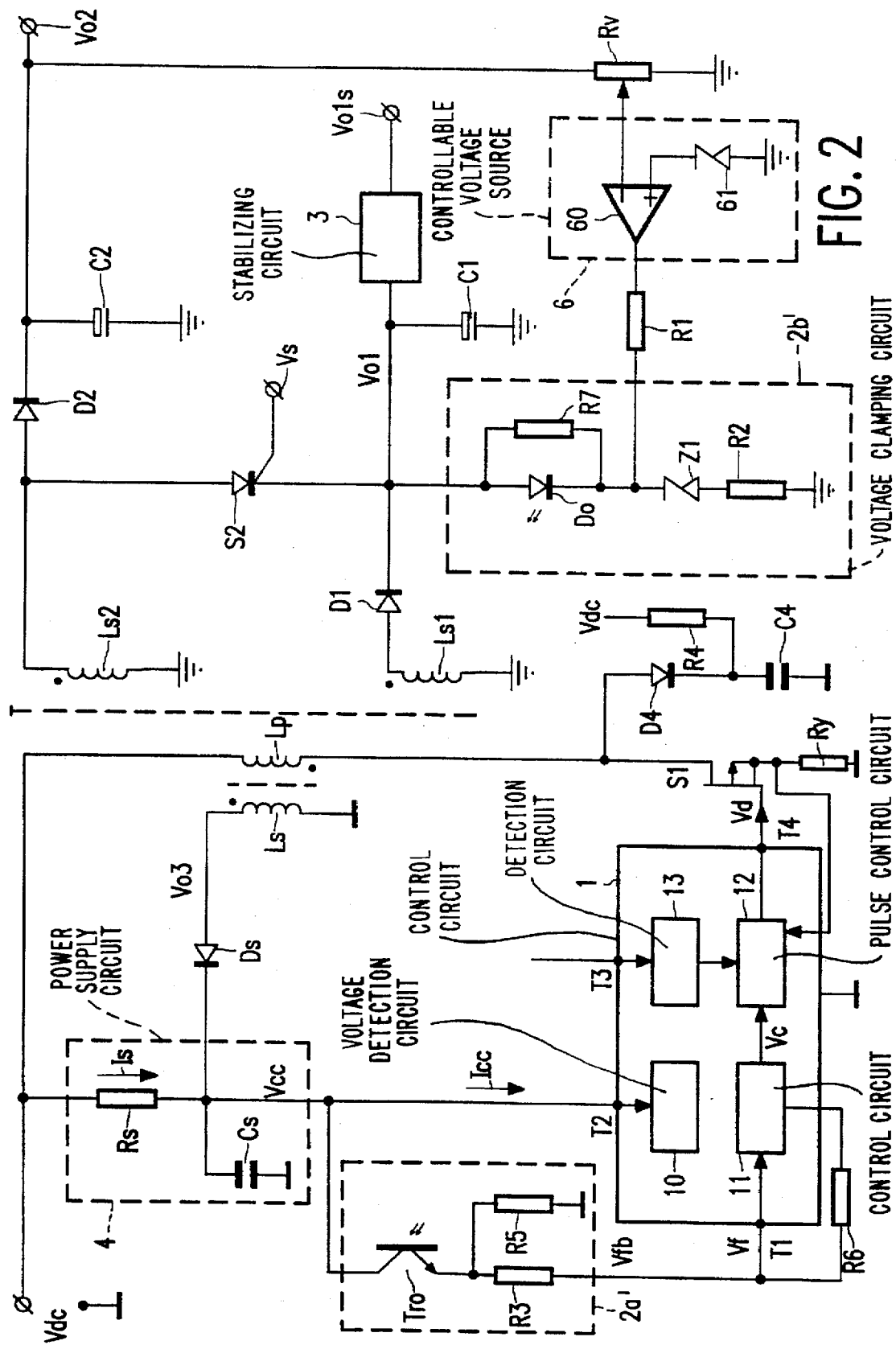
FIG. 2 shows another embodiment of the switched-mode power supply circuit according to the invention.

FIGS. 1 and 2 show embodiments of the switched-mode power supply circuit according to the invention.

The common part of the two embodiments will be described first. One side of a primary winding Lp of a transformer T is coupled to a terminal of a DC input voltage source Vdc. The other side of the primary winding Lp is coupled via a switch S1 (in this case the drain source path of a FET) to another terminal (further referred to as the primary earth) of the DC input voltage source Vdc. A first secondary winding Ls1 of the transformer T supplies a first output DC voltage Vo1 (further referred to as the standby voltage) via a first rectifier diode D1. The first rectifier diode D1 has an anode coupled to the first secondary winding Ls1 and a cathode coupled to a first output-smoothing capacitor C1 whose other terminal is connected to ground. A stabilizing circuit 3 has an input coupled to the cathode of the first rectifier diode D1 and an output for supplying a stabilized standby voltage Vo1s. A second secondary winding Ls2 of the transformer T supplies a second output DC voltage Vo2 (further referred to as the operating voltage) via a second rectifier diode D2. The second rectifier diode D2 has an anode coupled to the second secondary winding Ls2 and a cathode coupled to a second output-smoothing capacitor C2 whose other terminal is connected to ground. A series arrangement of a fourth diode D4 and a fourth capacitor C4 is coupled between a drain of the FET and the primary ground for limiting the peak voltage at the drain of the FET. An anode of the fourth diode D4 is coupled to the drain of the FET. The junction point of the fourth diode D4 and the fourth capacitor C4 is coupled via a fourth resistor R4 to the input voltage source Vdc for discharging the fourth capacitor C4.

A control circuit 1 (for example, the IC MC 44603 of Motorola) comprises a power supply voltage detection circuit 10, a control circuit 11, a pulse control circuit 12 and a detection circuit 13. The control circuit 1 has a power supply voltage input T2 for receiving a power supply voltage Vcc for providing the circuits in the control circuit 1 with the power supply voltage. The stabilizing control circuit 11 is coupled to a control input T1 of the control circuit 1 for receiving feedback information Vf. The control stabilizing circuit 11 supplies a control signal Vc to the pulse control circuit 12. The pulse control circuit 12 is coupled to a control pulse output T4 of the control circuit 1 for supplying control pulses Vc to a gate of the FET. On and off-times of the control pulses Vd are determined by the control signal Vt. Dependent on the type of control circuit 1, a repetition frequency of the control pulses Vd may also be controlled in dependence upon the control signal Vc. The detection circuit 13 is coupled to a detection input T3 of the control circuit 1. If a signal presented to the detection input T3 becomes active, the detection circuit 13 instructs the pulse control circuit 12 not to generate any further control pulses Vd (the switch S1 is no longer closed). The power supply voltage detection circuit 10 is coupled to the power supply voltage input T2. The power supply voltage detection circuit 10 brings the control circuit 1 to an off-state if the power supply voltage Vet has reached the value which is equal to an off-level. The power supply voltage detection circuit 10 brings the control circuit 1 to an on-state if the power supply voltage Vet has reached a value which is equal to a starting level.

The transformer T is further provided with a third winding Ls which generates a take-over voltage Vo3. The third winding Ls supplies the power supply voltage Vcc via a third rectifier diode Ds in the operating mode. The third rectifier diode Ds has an anode coupled to the third winding Ls and a cathode coupled to the power supply voltage input T2.

In the operating mode, the operating voltage Vo2 is, for example, a power supply voltage (for example, 140 V) for a horizontal deflection circuit, while the first secondary winding Ls1 supplies a standby voltage Vo1 (for example, 7 V), and the power supply winding Ls supplies a power supply voltage Vcc having a value above the off-level so that the control circuit 1 is continuously in the on-state in the operating mode of the switched-mode power supply.

For bringing the power supply to the standby mode, means S2,2b are provided for decreasing the take-over voltage Vo3. In FIGS. 1 and 2, these means comprise connection means S2 (a unidirectional switch, for example, a thyristor) coupled between the anode of the second rectifier diode D2 and the cathode of the first rectifier diode D1, and a voltage-clamping circuit 2b coupled between the first secondary winding Ls1 and ground. In the standby mode, the unidirectional switch S2 is closed as a result of an appropriate value of a standby mode indication signal Vs. The unidirectional switch S2 then conducts a current from the second to the first secondary winding. Closing of the unidirectional switch S2 has the result that the first output direct voltage Vo1 decreases to a value (slightly above the stabilized standby voltage Vo1s) determined by the voltage-clamping circuit 2b. The voltage-clamping circuit 2b may consist of only a zener diode Z1.

In FIG. 1, the voltage-clamping circuit 2b comprises a series arrangement of a first zener diode Z1, a parallel circuit of an opto-coupler diode Do and a first resistor R1 and a second resistor R2. A cathode of the first zener diode Z1 is coupled to the cathode of the first diode D1. An anode of the opto-coupler diode Do is coupled to an anode of the first zener diode Z1.

In FIG. 2, the voltage-clamping circuit 2b comprises a series arrangement of an opto-coupler diode Do, a first zener diode Z1 and a second resistor R2. An anode of the opto-coupler diode Do is coupled to the cathode of the first diode D1. A cathode of the first zener diode Z1 is coupled to a cathode of the opto-coupler diode Do.

The decrease of the take-over voltage Vo3 by decreasing the operating voltage Vo2 in the manner described above has the advantage that not only the power supply is brought to the standby mode when closing the unidirectional switch S2, but also the standby voltage Vo1 in the standby mode is maintained sufficiently high without a winding other than the second secondary winding Ls2 being necessary for supplying the standby voltage Vo1. It is not essential for the invention that exactly the second voltage Vo2 is decreased; also the decrease of the voltage generated by the first secondary winding Ls1 or of the take-over voltage Vo3 (for example, by arranging a clamping circuit across the first secondary winding Ls1 or across the take-over winding Ls) or the interruption of the take-over voltage Vo3 (for example, by rendering it possible to switch off the third diode D3) brings the power supply to the standby mode.

After activation of the means for decreasing the second voltage Vo2, the take-over voltage Vo3 supplied by the third winding Ls will decrease to below the off-level without any further measures. To supply the control circuit 1 in the standby mode with a power supply voltage Vcc, power supply circuit 4 is coupled between the DC input voltage source Vdc and the power supply voltage input T2 of the control circuit 1. In FIGS. 1 and 2, this power supply circuit 4 includes a resistor Rs which is coupled between the power supply voltage input T2 and the DC input voltage source Vdc so as to take up, as a current element, an input current Is from the DC input voltage source Vdc. A capacitor Cs is coupled between the power supply voltage input T2 and the primary ground so as to determine, as a current storage element, the value of the power supply voltage Vcc dependent on the input current Is and a power supply current Icc taken up by the control circuit 1. The resistor Rs and the capacitor Cs can also be used to start the power supply during an increase of the DC input voltage Vdc.

Let it be assumed that the power supply voltage Vcc has decreased to below the off-level. As stated previously, the power supply voltage detection circuit 10 brings the control circuit 1 to an off-state and, moreover, the control circuit 1 does not generate control pulses Vd and the control circuit 1 draws a supply current Icc from the power supply voltage input T2 which is smaller than the input current Is supplied by the current element Rs. Consequently, the power supply voltage Vcc will start to increase until the starting level is reached and the power supply voltage detection circuit 10 brings the control circuit 1 to the on-state. In the on-state, the control circuit 1 generates control pulses Vd at least for some time and the control circuit 1 draws a power supply current Icc from the power supply voltage input T2 which is larger than the input current Is. The control circuit 1 can now generate control pulses until the power supply voltage Vcc has decreased to the off-level again, and so forth. The power supply operates in a burst mode in which the control circuit 1 is alternately in the off-state and for short periods in on-state.

The embodiments in accordance with FIGS. 1 and 2 show further refinements of the basic principle described above.

FIG. 1 shows an embodiment of a power supply which, in the standby mode, limits a maximum value of the standby voltage Vo1 and stabilizes the operating voltage Vo2 in the operating mode. For limiting the standby voltage Vo1, the previously mentioned voltage-clamping circuit 2b is arranged between the cathode of the first rectifier diode D1 and ground. The opto-coupler diode Do is optically coupled to an opto-coupler transistor Tro. The opto-coupler transistor Tro has a collector coupled to the power supply voltage input T2 of the control circuit 1, and an emitter which supplies a feedback voltage Vfb to the detection input T3 of the control circuit 1 via a third resistor R3. The series arrangement of the opto-coupler transistor Tro and the third resistor R3 constitutes the primary pan 2a of the feedback network 2a, 2b. During the generation of control pulses Vd in the standby mode by means of the pulse control circuit 12, the standby voltage Vo1 increases. When the standby voltage Vo1 has increased to a maximum value determined by the zener voltage of the zener diode Z1, a current will start flowing through the opto-coupler diode Do and the opto-coupler diode Do will emit light. The opto-coupler transistor Tro will start conducting and the voltage at the detection input T3 increases to a detection level at which the detection circuit 13 instructs the pulse control circuit 12 not to generate any further control pulses Vd. The standby voltage Vo1 now starts decreasing again. The power supply voltage Vcc continues to decrease until the off-level is reached and the control circuit 1 is brought to the off-state. Now, the power supply voltage Vcc starts increasing again, and so forth. The period in which control pulses Vd are generated starts at the instant when the starting level is reached and ends at the instant when the standby voltage Vo1 has reached the maximum level. In this way, the generation of control pulses is influenced for causing the standby voltage Vo1 not to further increase when the maximum value of the standby voltage Vo1 is reached via the feedback network 2a, 2b. The maximum value of the standby voltage Vo1 may also be limited by connecting the feedback network 2a, 2b to a voltage related to the standby voltage Vo1 such as the operating voltage Vo2 or the take-over voltage Vo3, rather than to the standby voltage Vo1.

In the operating mode of the power supply, the operating voltage Vo2 may be stabilized by feedback at the primary side of the power supply. To this end, a series arrangement of a fifth diode D5 and an adjustable resistor Rv is arranged between the control input T1 of the control circuit 1 and the power supply winding Ls. The anode of the fifth diode D5 is coupled to the anode of the third rectifier diode Ds, the cathode of the fifth diode D5 is coupled to a first end of the adjustable resistor Rv. The adjustable resistor Rv has a wiper which is coupled to the control input T1 and a second terminal which is coupled to the primary ground. The anode of the fifth diode D5 is coupled to the primary ground via a fifth capacitor C5 for smoothing the feedback information Vf. The take-over voltage Vo3 generated by the power supply winding Ls influences the on and off-times of the (periodically occurring) control pulses Vd via the control circuit 11 for maintaining the take-over voltage Vo3 and the related operating voltage Vo2 constant. It will be evident that the power supply will also reach the standby mode if, in this case, the take-over voltage Vo3 is decreased by acting on the feedback, for example, by connecting the junction point of the fifth diode D5 and by connecting the adjustable resistor Rv by means of a further switch (not shown) via a further resistor to the control input T1.

FIG. 2 shows another embodiment of a power supply which, in the standby mode, limits a maximum value of the standby voltage Vo1 and stabilizes the operating voltage Vo2 in the operating mode. For limiting the standby voltage Vo1, a voltage-clamping circuit 2b' is arranged between the cathode of the first rectifier diode D1 and ground. The voltage-clamping circuit 2b' comprises a series arrangement of an opto-coupler diode Do, a zener diode Z1 and a second resistor R2. An anode of the opto-coupler diode Do is coupled to the anode of the first diode D1. A cathode of the zener diode Z1 is coupled to a cathode of the opto-coupler diode Do. A seventh resistor R7 may be arranged parallel to the opto-coupler diode Do for supplying a bias current of the zener diode Z1 for better stabilization of a zener voltage across the zener diode Z1. The opto-coupler diode Do is optically coupled to an opto-coupler transistor Tro. The opto-coupler transistor Tro has a collector which is coupled to the power supply voltage input T2 of the control circuit 1, and an emitter which is coupled to the control input T1 of the control circuit 1 via a third resistor R3. A fifth resistor R5 may be arranged between the emitter of the opto-coupler transistor Tro and the primary ground for adjusting the current through the opto-coupler transistor Tro. A sixth resistor R6 may be arranged between the control input T1 and a further input of the control circuit 11 for adjusting a gain factor of the control circuit 11. The series arrangement of the opto-coupler transistor Tro and the third resistor R3 constitutes the primary part 2a of the feedback network 2a, 2b'. The cathode of the opto-coupler diode Do is also coupled to an output of a controllable voltage source 6 (for example, TL431 of Motorola) via a first resistor R1. The controllable voltage source 6 comprises a differential amplifier 60 and a zener diode 61. The differential amplifier 60 has an inverting input coupled to a wiper of an adjustable resistor Rv, a non-inverting input coupled to a cathode of the zener diode 61 and an output coupled to the first resistor R1. An anode of the zener diode Z1 is coupled to ground. The adjustable resistor Rv has one end coupled to ground and another end coupled to receive the operating voltage Vo2.

In the standby mode of the power supply, operating voltage Vo2 is so low that the controllable voltage source 6 does not have any influence on the current through the opto-coupler diode Do. During the generation of control pulses Vd by the pulse control circuit 12 in the standby mode, the standby voltage Vo1 increases. When the standby voltage Vo1 has increased to a maximum value which is determined by the zener voltage of the zener diode Z1 and a forward voltage across the opto-coupler diode Do, the opto-coupler diode Do will emit light. Consequently, the opto-coupler transistor Tro will start conducting and the voltage at the control input T1 increases, while the control circuit 1 will reduce the supply of energy to the transformer T so as to stabilize the standby voltage Vo1. The reduction of the supply of energy is, for example, possible by reducing the on and off-times of the first switch S1 or by reducing the frequency of the control pulses Vd. Meanwhile, the power supply voltage Vcc continues to decrease until the off-level is reached, and the control circuit 1 is brought to the off-state. Now, the power supply voltage Vcc starts increasing again, and so forth. The period in which control pulses Vd are generated starts at the instant when the starting level is reached and ends at the instant when the power supply voltage Vcc has reached the off-level. In this way, the generation of control pulses for not further increasing the standby voltage Vo1 is influenced when the maximum value of the standby voltage Vo1 is reached via the feedback network 2a, 2b. Now, the maximum value of the standby voltage Vo1 may also be limited by connecting the feedback network 2a, 2b to a voltage related to the standby voltage Vo1, such as the operating voltage Vo2 or the take-over voltage Vo3, rather than to the standby voltage Vo1. An advantage of stabilizing the standby voltage Vo1 is that the ripple of the standby voltage Vo1 can be maintained small, and a smaller dissipation in the stabilizing circuit 3 for stabilizing the standby voltage Vo1 is possible, though control pulses Vd are generated for a longer period.

In the operating mode of the power supply, the operating voltage Vo2 is stabilized by influencing the current through the opto-coupler diode Do via the controllable voltage source 6. When using the Motorola IC MC 44603 as control circuit 1, a higher operating voltage Vo2 results in a smaller voltage across the controllable voltage source 6 and hence in a larger current through the opto-coupler diode Do, while a feedback voltage Vfb supplied by the opto-coupler transistor Tro to the control input T1 of the control circuit 1 increases and the control circuit 1 reduces the on-time of the switch S1. When using a different IC for the control circuit 1, a different polarity of the feedback voltage Vfb may be necessary. Now it will also be evident that the power supply also reaches the standby mode if in this case the take-over voltage Vo3 is decreased by acting in the feedback path, for example, by connecting the operating voltage Vo2 by means of a further switch (not shown) via a further resistor to the inverting input of the controllable voltage source 6.

In FIG. 2, a resistor Ry is inserted in series with the switch S1. The voltage across this resistor Ry is a measure of the current flowing through the primary winding Lp. The pulse control circuit 12 has an input to receive the voltage across the resistor Ry for controlling the peak current through the primary winding in a known way. In this way, it is possible to keep the peak current below a level needed to avoid annoying audible noise of the transformer during the standby mode.

Figure 3A:
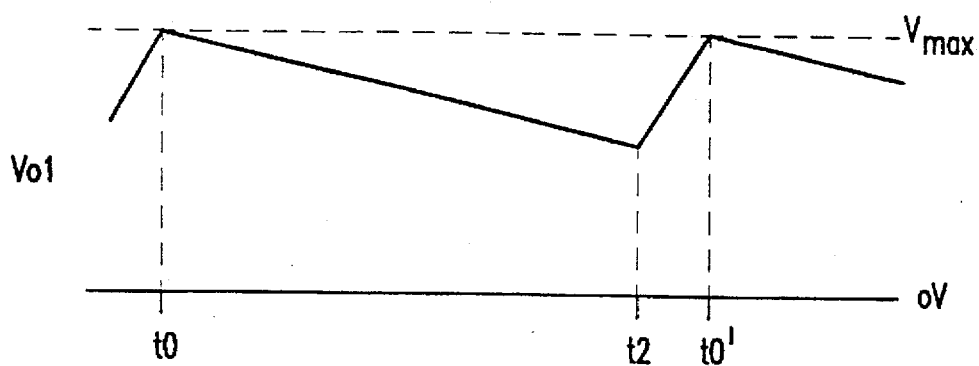
FIGS. 3a–3b show time diagram to illustrate the operation of the embodiment of the invention shown in FIG. 1.
Figure 3B:
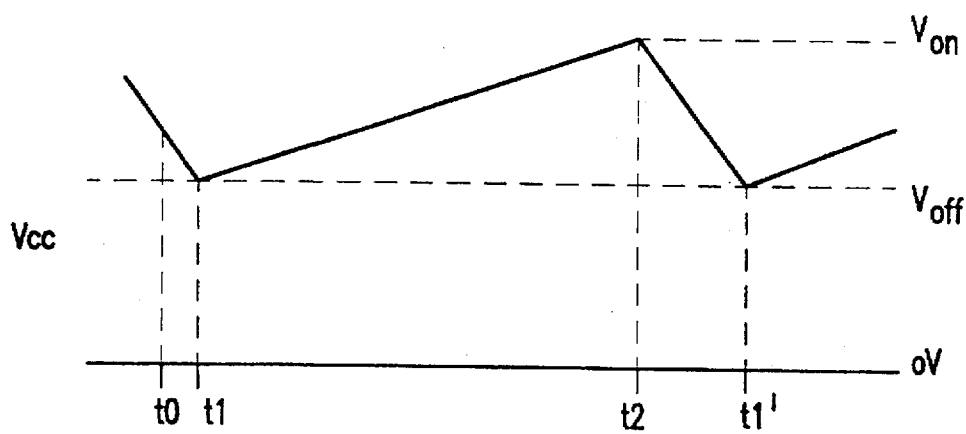
Figure 3C:
Figure 3D:
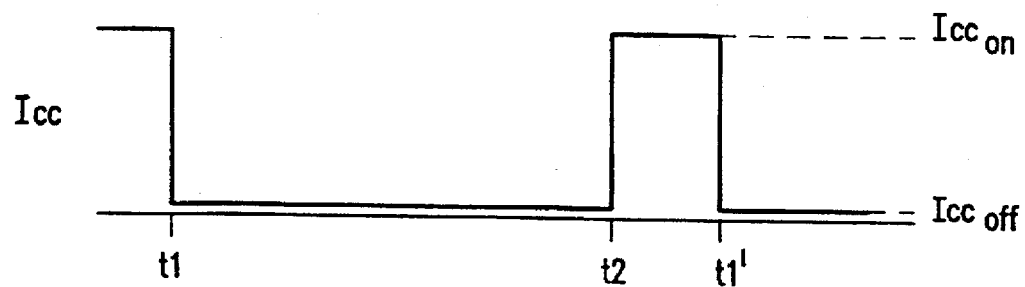

FIGS. 3a, 3b, 3c and 3d show time diagrams to illustrate the operation of the embodiment of the invention in accordance with FIG. 1 in the standby mode. FIG. 3a shows the variation of the standby voltage Vo1, FIG. 3b shows the variation of the power supply voltage Vcc of the control circuit 1, FIG. 3c shows the control pulses Vd, and FIG. 3d shows the variation of the power supply current Icc. Before the instant t0, the control circuit 1 is in the on-state, the standby voltage Vo1 increases and the power supply voltage Vcc decreases. At the instant t1, the power supply voltage Vcc has decreased to the off-level Voff and the control circuit 1 is brought to the off-state in which the power supply voltage Vcc increases (the power supply current Ice has a value Iccoff which is smaller than the input current Is) and the standby voltage Vo1 decreases. The power supply voltage Vcc increases until the starting level Von is reached at the instant t2, and the control circuit 1 starts generating control pulses Vd. Consequently, the standby voltage Vo1 increases and the power supply voltage Vcc decreases (the power supply current Icc now has a value Iccon which is larger than the input current Is). At the instant t0', the standby voltage Vo1 has increased to a maximum value Vmax at which the opto-coupler diode Do starts to convey current and the voltage at the detection input T3 of the control circuit 1 increases to above a detection level. The detection circuit 13 stops, via the pulse control circuit 12, the generation of further control pulses Vd. The standby voltage Vo1 starts to decrease and the power supply voltage Vcc continues to decrease until the off-level Voff is reached and a subsequent cycle starts again.

Figure 4A:
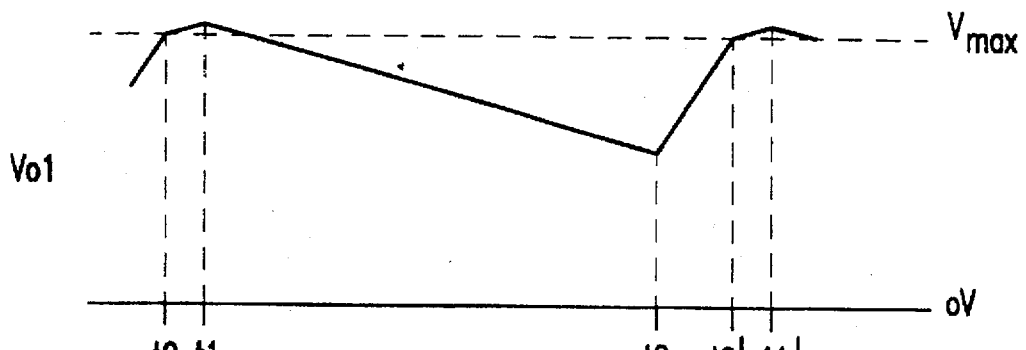
FIGS. 4a–4b shows a time diagram to illustrate the operation of the embodiment of the invention shown in FIG. 2.
Figure 4B:
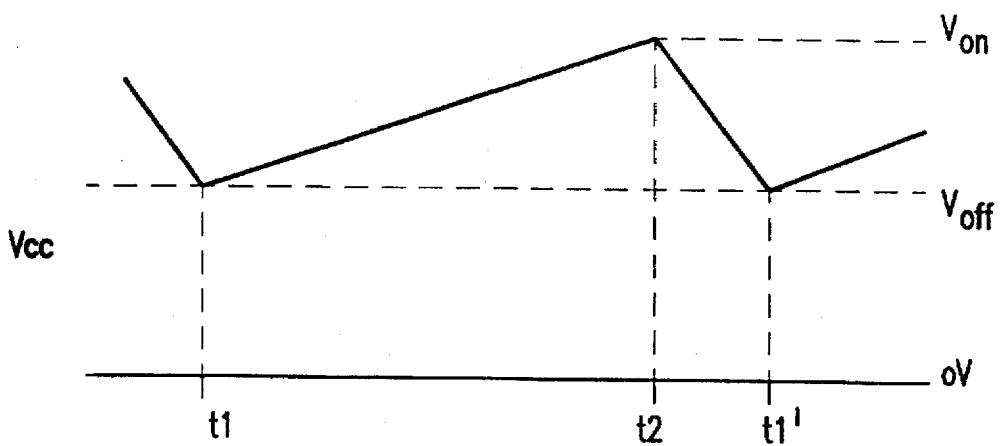
Figure 4C:
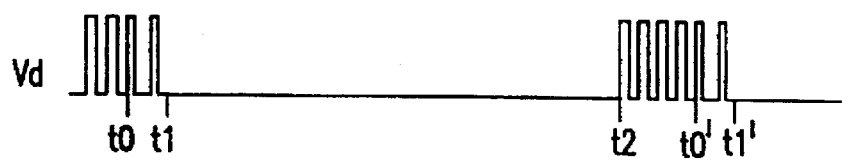

FIGS. 4a, 4b and 4c show time diagrams to illustrate the operation of the embodiment of the invention in accordance with FIG. 2 in the standby mode. FIG. 4a shows the variation of the standby voltage Vo1, FIG. 4b shows the variation of the power supply voltage Vcc, and FIG. 4c shows the control pulses Vd. Just before the instant t0, the control circuit 1 is in the on-state: control pulses Vd are generated, the standby voltage Vo1 is stabilized and the power supply voltage Vcc decreases. At the instant t1, the power supply voltage Vcc, has decreased to the off-level Voff and the control circuit 1 is brought to the off-state in which the power supply voltage Vet increases and the standby voltage Vo1 decreases. The power supply voltage Vce increases until the starting level Von is reached at the instant t2, whereafter the control circuit 1 generates control pulses Vd, the standby voltage Vo1 increases and the power supply voltage Vcc decreases. At the instant t0', the standby voltage Vo1 has increased to a maximum value Vmax at which the opto-coupler diode Do starts conveying current and the voltage at the control input T1 of the control circuit 1 becomes active for stabilizing the standby voltage Vo1. The standby voltage Vo1 is thus kept substantially constant and the power supply voltage Vcc continues to decrease until the off-level Voff is reached and a subsequent cycle starts again.

Figure 5:
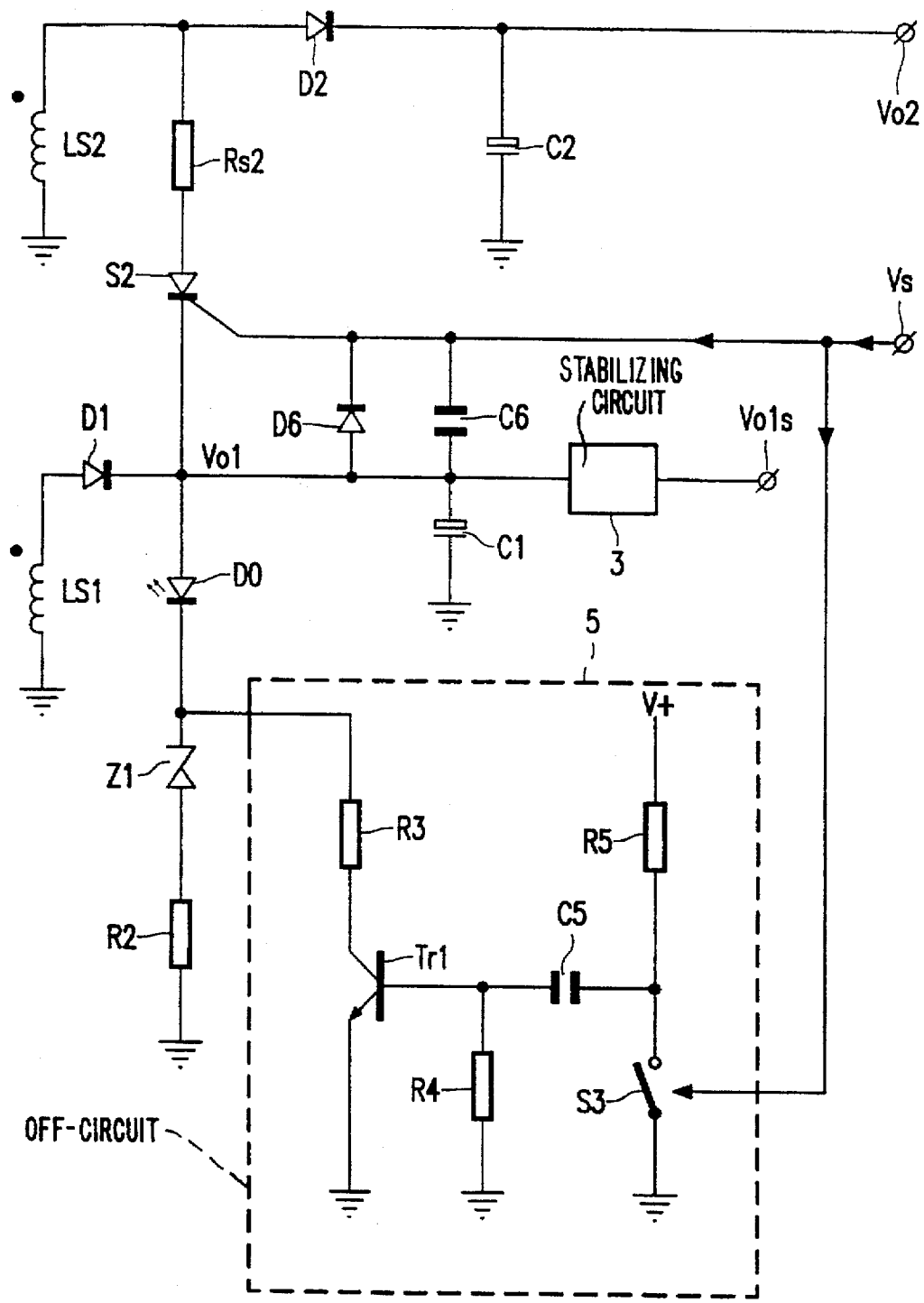
FIG. 5 shows an alternative embodiment for a part of the secondary part of the switched-mode power supply circuit shown in FIG. 2.

FIG. 5 shows an alternative embodiment of a part of the secondary part of the switched-mode power supply circuit. The secondary part of the power supply shown in FIG. 5 is an alternative to the secondary part shown in FIG. 2. For the sake of simplicity, the feedback network, comprising the first resistor R1, the controllable voltage source 6 and the adjustable resistor Rv, is omitted. A resistor Rs2 may be arranged in series with the unidirectional switch S2 for limiting the current during a change of the power supply from the operating mode to the standby mode. The current in the unidirectional switch S2 may also be limited by means of an off-circuit 5 and a soft-start circuit 11, 12. The soft-start circuit may consist of the control circuit 11 and the pulse control circuit 12, for example for limiting the duty cycle of the control pulses Vd so that the switch S1 is closed each time for only a short period.

The off-circuit 5 comprises a third resistor R3 coupled between the cathode of the opto-coupler diode Do and a collector of a bipolar npn transistor Tr1, an emitter of which is coupled to ground and a base of which is also coupled to ground via a fourth resistor R4. The base of the bipolar npn transistor Tr1 is further connected via a fifth capacitor C5 to a junction point of a fifth resistor R5, the other side of which is provided with a positive voltage, and a third switch S3, the other side of which is connected to ground. The third switch S3 has a switching input coupled to the standby mode indication signal Vs. If the standby mode indication signal Vs becomes active, the third switch S3 will be opened. Via the fifth resistor R5 and the fifth capacitor C5, the bipolar npn transistor Tr1 starts conducting for a given period of time which is necessary for charging the fifth capacitor C5.

The conducting first transistor Tr1 causes a large current through the opto-coupler diode Do, whereby a large current will also start flowing in the opto-coupler transistor Tro in the way as described with reference to FIG. 2. Due to the large current in the opto-coupler transistor Tro, the control pulses Vd are given a duty cycle of zero via the stabilizing control circuit 11 during the given period of time (the switch S1 is no longer closed). The given period of time should last at least for such a long time that the power supply voltage Vcc of the control circuit 1, which is still in the on-state, has decreased to the off-level (or to a level just above the off-level). When this level is reached, soft-start circuit 11, 12 is first brought to an initial state and subsequently, the control circuit 1 is brought to the off-state, while the power supply voltage Vet starts increasing. When the starting level is reached, the control circuit 1 will generate control pulses Vd under the control of the soft-start circuit 11, 12. The soft-start circuit 11, 12 which is in the initial state, provides a small peak current in the primary winding Lp and hence in the secondary windings Ls1, Ls2. Subsequently, the soft-start circuit 11, 12 provides for a slow increase of the duty cycle. The small duty cycle can be controlled accurately by using a peak current variation measured in the primary winding Lp for causing this peak current to increase in accordance with a desired variation with respect to time.

A parallel arrangement of a sixth diode D6 and a sixth capacitor C6 is coupled between the cathode and a switching input of the thyristor S2. An anode of the sixth diode D6 is coupled to the cathode of the thyristor S2. The sixth capacitor C6 ensures that the thyristor S2 does not start conducting before the power supply voltage Vcc has reached the off-level. The control circuit then no longer generates any control pulses Vd at the instant when the thyristor starts conducting. The thyristor 82 should be closed at the instant when the control circuit 1 reaches the on-state.

When the standby mode indication signal Vs becomes active, the generation of control pulses Vd will be immediately discontinued via the off-circuit 5, if the opto-coupler transistor Tro is coupled to the detection input T3, as is shown in FIG. 1. The detection circuit 13 suppresses the generation of control pulses Vd until the off-level is reached. The period of time determined by the capacitor C5 is then no longer important in connection with the suppression of the control pulses Vd. However, this given period of time is still important to reach the off-level more rapidly. In fact, the large current through the opto-coupler transistor Tro will cause the power supply voltage Vcc to decrease more rapidly.

Figure 6:
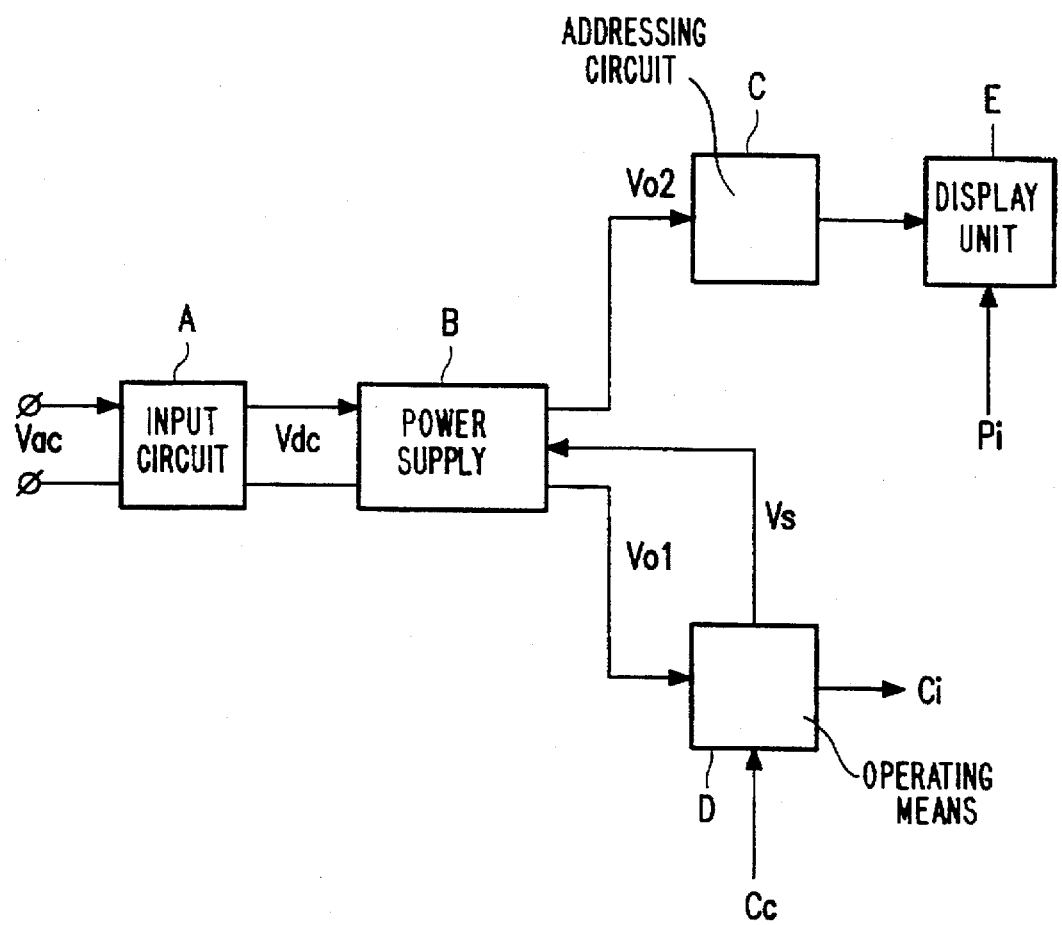
FIG. 6 is a block diagram of a part of a picture display apparatus provided with a switched-mode power supply circuit according to the invention.

FIG. 6 shows a block diagram of a part of the picture display apparatus provided with a switched-mode power supply circuit according to the invention. An input circuit A receives an AC voltage Vac (for example, the line voltage) and supplies the DC input voltage Vdc to the switched-mode power supply circuit B (further referred to as power supply). The power supply B supplies the standby voltage Vo1 to operating means D (for example, a microcomputer) and supplies the operating voltage Vo2 to an addressing circuit C. The addressing circuit C controls a display unit E for determining a position of picture information Pi to be displayed. The operating means receive operating commands Cc (for example given by a user) and supply the standby mode indication signal Vs to the power supply B, and operating information Ci to other circuits (not shown, for example, for brightness control of the displayed picture information Pi). In the operating mode of the picture display apparatus, the power supply B generates both the operating voltage Vo2 (for example, 140 V) and the standby voltage Vo1 (for example, 5 V), while the addressing circuit C and the operating means D are active. In the standby mode, the standby voltage Vo1 is maintained and the operating voltage Vo2 is decreased to a value which is approximately equal to the standby voltage Vo1 (for example, 7 V). To reach a minimum power consumption in the standby mode, it should be ensured that the addressing circuit C in the standby mode does not consume any power (or a very small power) from the operating voltage Vo2. This is possible due to the considerable decrease of the operating voltage Vo2 without having to use any special (expensive) provisions in the addressing circuit C for decoupling the operating voltage Vo2 or for inactivating this voltage. The operating means D remain active in the standby mode so as to bring the picture display apparatus to the operating mode, if desired.

Figures 7A, 7B:
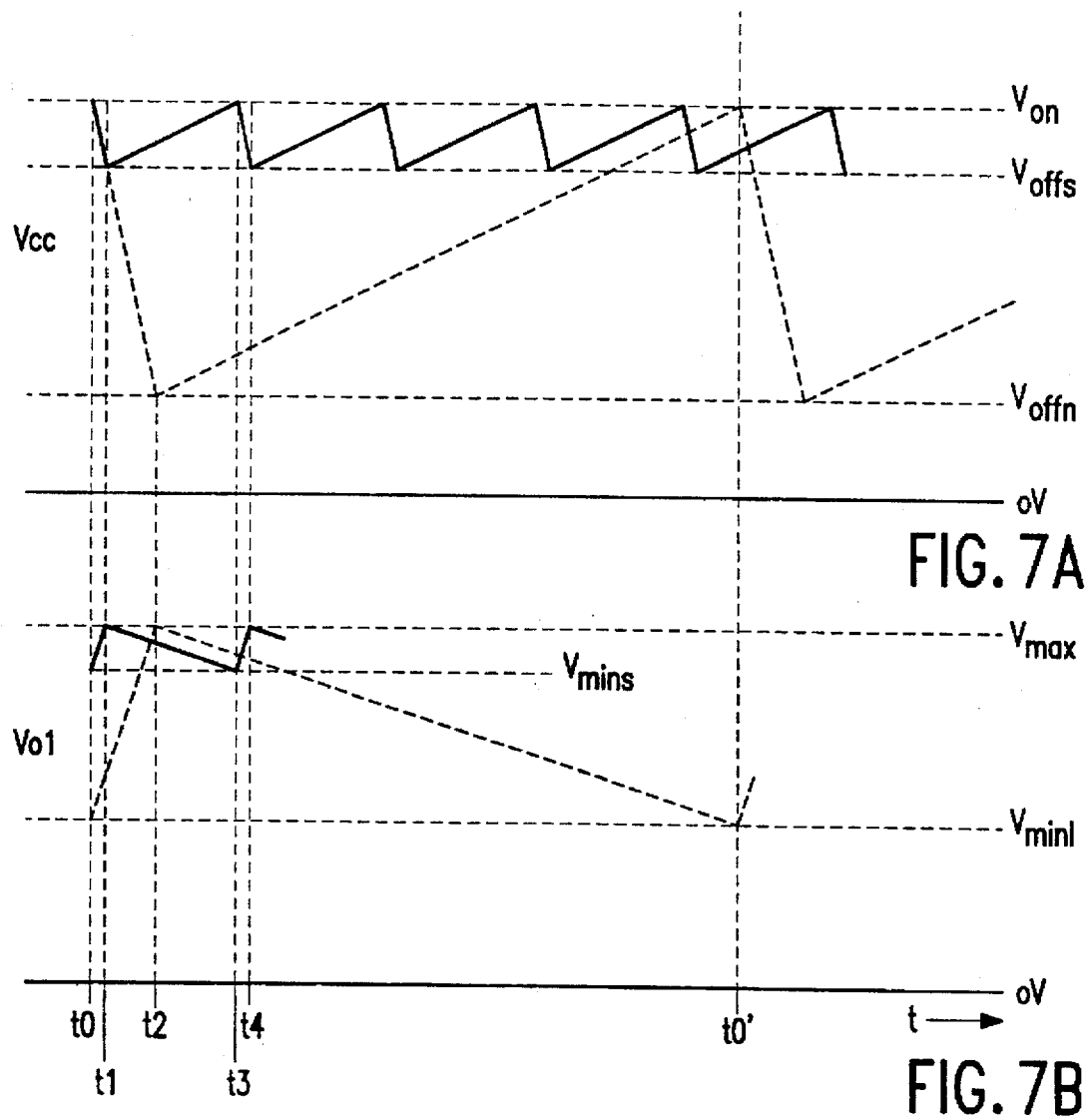
FIGS. 7A and 7B show time diagrams to illustrate the effect of decreasing the difference between the starting level and the off-level.

FIGS. 7A and 7B show time diagrams to illustrate the effect of decreasing the difference between the starting level Von and the off-level Voff. FIG. 7A shows the power supply voltage Vcc received by the control circuit 1. FIG. 7B shows the standby voltage Vo1. Von is the starting level, Voffn is the normal off-level used in the normal operating mode, and Voffs is a new standby off-level chosen at a level between the starting level Von and the normal off-level Voffn. In a standby mode, in which the power supply voltage Vcc meanders between the starting level Von and the normal off-level Voffn, no control pulses Vd will be generated for a long time t2-t0' and the standby voltage Vo1 will drop from Vmax to Vminl, as shown by the dashed lines in FIGS. 7A and 7B. In a standby mode, in which the power supply voltage Vcc meanders between the starting level Von and the standby off-level Voffs, no control pulses Vd are generated for a shorter period of time t1-t3, and the standby voltage Vo1 will only drop from Vmax to Vmins, as shown by the non-dashed lines. Instead of minimizing the ripple on the standby voltage Vo1, it is also possible to connect a smaller smoothing capacitor C1 to the standby voltage Vo1.

FIGS. 8A and 8B show time diagrams to illustrate a transition of the power supply from the normal operating mode to the standby mode. FIG. 8A shows the power supply voltage Vcc, and FIG. 8B shows the standby voltage Vo1. The power supply receives a command (the standby mode indication signal) indicating a desired transition from normal operating mode to standby mode at transition moment tt. Before the moment tt, the power supply is in the normal operating mode, the power supply voltage Vcc has a value Vccn determined by the take-over voltage Vo3. The value Vccn has to lie between the normal off-level Voffn and the starting level Von so that the control circuit 1 is in the on-state and generates control pulses Vd continuously. As an example, it is assumed that the value Vccn is close below the standby off-level Voffs. (Vccn may have any value above Voffn).

Without special provisions, the control circuit 1 keeps generating control pulses Vd after the transition moment tt, and the power supply voltage Vcc starts decreasing, see the dashed line in FIG. 8A. It is assumed that in the normal operating mode of the power supply, the control circuit 1 checks the mode in which the power supply has to operate only at the moment the power supply voltage Vcc reaches the starting level Von. So still the normal off-level Voffn is active. The power supply voltage Vcc reaches the normal off-level Voffn at moment 13 and the control circuit 1 changes into the off-state, whereafter the power supply voltage Vcc starts increasing till the on-level Von is reached at moment 15. Now, the control circuit 1 changes to the on-state and detects that a transition to the standby mode needs to be started. Therefore the normal off-level Voffn is changed to the standby off-level Voffs. During the period between moments t3 and t5, the control circuit 1 is in the off-state and the standby voltage Vo1 decreases till a minimum voltage Vminl, see the dashed line in FIG. 8B.

In a preferred embodiment, the control circuit 1 is forced into the off-state at transition moment tt, the power supply voltage Vcc starts rising immediately and the starting level Von is reached at moment t1, see the non-dashed line in FIG. 8A. In this case, the power supply changes to the standby mode within a short period of time tt-t1 and the standby voltage Vo1 only decreases during this short period and thus shows a far smaller voltage dip Vmins, see the non-dashed line in FIG. 8B.

It would also be possible for the control circuit 1 to check every active cycle whether a transition to the standby mode needs to be performed. If such a transition is detected, the normal off-level Voffn is changed to the standby off-level immediately. Such a system is, however, more sensitive to disturbances.

FIG. 9 shows a time diagram of the power supply voltage Vcc to illustrate a transition of the power supply from the standby mode to the normal operating mode. The power supply receives a command indicating a desired transition from standby mode to normal operating mode at transition moment tt' or tt. Before the transition moment tt' or tt, the power supply is in the standby mode and the power supply voltage Vcc meanders between the starting level Von and the standby off-level Voffs.

If the command occurs at moment tt', during a period in which the control circuit 1 is in the off-state, the control circuit 1 will stay in the off-state until the starting level Von is reached at moment t1. Now, the control circuit enters the on-state and checks whether the power supply has to change mode. In this case, the control circuit 1 detects that a normal operating mode should be entered and consequently lowers the standby off-level Voffs to the normal off-level Voffn and starts generating control pulses Vd. The power supply voltage Vcc starts decreasing, and the take-over voltage Vo3 starts increasing. The take-over voltage Vo3 needs to reach such a value that the related power supply voltage Vcc is above the normal off-level Voffn before moment t3. If this is not the case, the control circuit 1 changes to the off-state at moment t3 and the power supply is not working in the normal operating mode within one cycle. This causes an unwanted dip in the standby voltage Vo1. So, it is clear from the above that it is preferred that the take-over voltage Vo3 rises so fast that, within a period of time between the moments t1 and t3, the power supply voltage Vcc is above the normal off-level Voffn. In FIG. 9 the power supply voltage Vcc reaches a level Vccn at moment t2.

Now, let it be assumed that the command occurs at moment tt just before the moment the standby off-level Voffs is reached. In the on-state of the control circuit 1 during standby, the control circuit 1 continuously checks whether the power supply needs to change to the normal operating mode. As at moment tt, a command indicating a change to the normal operating mode is detected, the control circuit 1 changes the standby off-level Voffs to the normal off-level Voffn. This causes the control circuit 1 to stay active, so that the power supply voltage Vcc further decreases. The take-over voltage Vo3 starts increasing at moment tt and again needs to be high enough before moment t5, so the time available for the take-over voltage Vo3 to provide a one-cycle start-up of the power supply is now a period t4 to tt smaller than in the previous case. In the standby mode, the control circuit 1 not only adapts the off-level Voff, but also the peak current in the transformer is limited to keep noise generated by the transformer below a desired level, and the slow-start option is disabled. At the moment the control circuit 1 changes to the normal operating mode, also the peak current limiting should be switched off and the slow-start option should be enabled.

If the standby voltage has reached a maximum level before moment tt, in one embodiment of the power supply, the generation of control pulses Vd is stopped. Consequently, no control pulses Vd will be generated until the starting level Von is reached, which causes a large dip in the standby voltage Vo1.

In a preferred embodiment, the control circuit 1 is forced into the off-state at transition moment tt. The power supply voltage Vcc starts rising immediately and the starting level Von is reached at moment t6, see the non-dashed line in FIG. 9. Now, the control circuit 1 changes to the on-state and detects that the power supply should further operate in the normal operating mode. The power supply voltage Vcc starts decreasing at moment t6, and the take-over voltage Vo3 should be high enough before moment t7 at which the normal off-level would be reached. In this way, again a maximum time is available for the take-over voltage Vo3 to reach the value high enough to provide a one-cycle start-up of the power supply.

Figure 10:
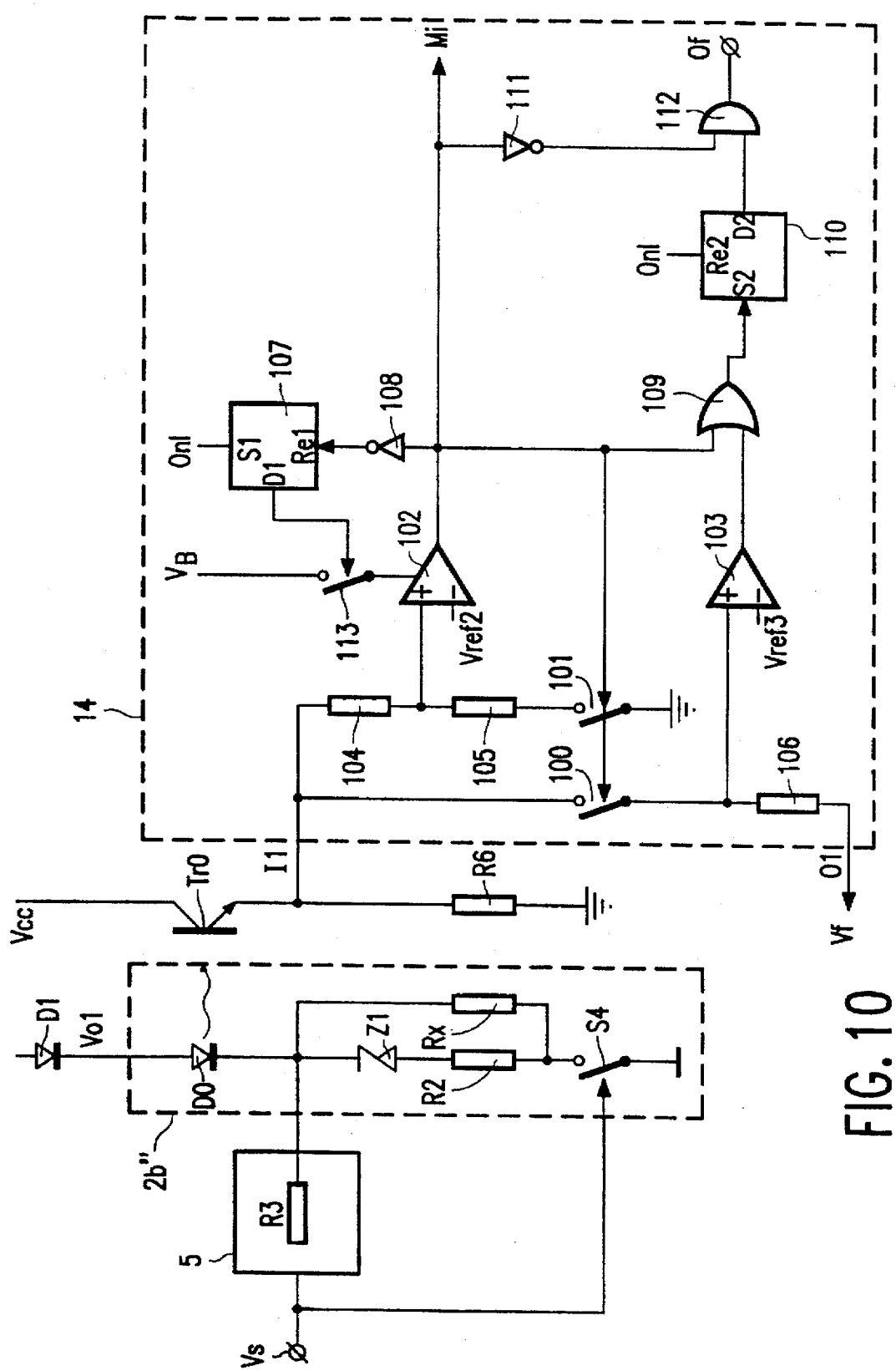
FIG. 10 shows a circuit which switches the control circuit 1 into the off-state in response to a detected transition of the power supply.

FIG. 10 shows a circuit which switches the control circuit 1 into the off-state in response to a detected transition of the power supply. The standby mode indication signal Vs is supplied to the off-circuit 5 which comprises the same elements as shown in FIG. 5. The resistor R3 of the off-circuit 5 is connected to the cathode of the opto-coupler diode Do. The voltage-clamping circuit 2b" comprises a series arrangement of the opto-coupler diode Do, a zener diode Z1, a second resistor R2, and a switch S4. An anode of the opto-coupler diode Do is coupled to the anode of the first diode D1 to receive the standby voltage Vo1. A cathode of the zener diode Z1 is coupled to a cathode of the diode Do. The switch S4 is coupled between the resistor R2 and the primary ground and has a control input to receive the standby mode indication signal Vs. A resistor Rx is connected parallel to the series arrangement.

The opto-coupler transistor Tro, which is optically coupled to the opto-coupler diode Do, has a collector coupled to the power supply voltage Vcc, and an emitter connected to the secondary ground via a resistor R6. The emitter of the opto-coupler transistor Tro is further connected to an input I1 of the decision circuit 14, which may be part of the voltage detection circuit 10. The decision circuit 14 comprises a comparator 102 which has an inverting input connected to a reference voltage Vref2, a non-inverting input connected to the input I1 via a resistor 104, an output to supply a mode indication signal Mi, and a further input coupled to a supply voltage Vb via a switch 113. The non-inverting input of comparator 102 is connected to ground via a series arrangement of a resistor 105 and a switch 101 which is controlled by the mode indication signal Mi. A set-reset flip-flop 107 has a reset input Re1 to receive the output signal of the comparator 102 via an inverter 108, a set input S1 to receive a signal On1 indicating that the power supply voltage Vcc reached the starting level Von, and an output D1 to control the switch 113. A comparator 103 has an inverting input to receive a reference voltage Vref3, a non-inverting input connected via a switch 100 controlled by the mode indication signal Mi to the input I1 and via a resistor 106 to an output O1 of the decision circuit 14 which supplies Vf, and an output connected to a first input of an OR gate 109. The OR gate 109 has a second input to receive the mode indication signal Mi. A set-reset reset flip-flop 110 has a set input S2 connected to an output of the OR gate 109, a reset input Re2 to receive the signal On1, and an output D2 connected to a first input of an AND gate 112. The AND gate 112 has a second input to receive the mode indication signal Mi via an inverter 111, and an output to supply an off-signal Of.

To elucidate the operation of the circuit of FIG. 10, there is a successive description of: a start-up of the power supply to the normal operating mode, the normal operating mode, a transition from normal operating mode to standby mode, the standby mode, and a transition from standby mode to normal operating mode.

At a first start-up to the normal operating mode, no current will flow through the opto-coupler transistor Tro. As long as the control circuit is not active, the switches 100 and 101 are open and resistor R6 guarantees that the voltage at the input I1 is low. The control circuit 1 becomes active as soon as the power supply voltage Vcc reaches the starting level Von, while switch 100 stays open and switches 101 and 113 close. The output of comparator 102 stays low as the voltage on the input I1 is low. So, the mode indication signal Mi has a low level which indicates the normal operating mode and thus the normal off-level Voffn is selected. The low level of the mode indication signal Mi opens switch 113 via inverter 108 and flip-flop 107, and thus the comparator 102 is disabled and keeps supplying a low level at its output. The low mode indication signal Mi further causes switch 100 to be closed and switch 101 to be opened. The opto-coupler transistor Tro current will be supplied completely to the output O1 of decision circuit 14 to be used by the control circuit 11 to control the switching of switch S1 to stabilize the operating voltage Vo2.

In the normal operating mode of the power supply, the standby mode indication signal Vs and the off-circuit 5 are inactive. The current through the opto-coupler diode Do is determined by the operating voltage Vo2 for stabilizing this operating voltage Vo2 in a way as shown in FIG. 2. The maximum current through the opto-coupler transistor Tro during the normal operating mode, the values of the resistor 106, and the value of the reference voltage Vref3 are selected such that comparator 103 supplies a low level at its output. As the output voltage of comparator 103 is low, the output D2 of flip-flop 110 stays low and the off-signal Of is low, which indicates that the control circuit should not be switched to the off-state. The decision circuit 14 will stay in the situation described above during the normal operation mode. The situation changes if comparator 103 detects such a large current through the opto-coupler transistor Tro that its non-inverting input voltage exceeds the reference voltage Vref3, which is the case if a transition to the standby mode is desired. The signal On1 becomes high at the moment the power supply Vcc reaches the starting level Von. During the normal operation mode, the power supply voltage Vcc is determined by the take-over voltage Vo3 and never reaches the on-level Von.

A transition from the normal operating mode to the standby mode will now be described. The off-circuit 5 generates a large current through the opto-coupler diode Do during a certain period of time as soon as the standby mode signal Vs becomes active. This causes a large current through the opto-coupler transistor Tro and through resistor 106, as switch 100 is closed and switch 101 is open. The output of comparator 103 becomes high and flip-flop 110 is set. Because the comparator 102 is still disabled, its output stays low. The AND gate 112 receives a high level at both inputs and thus supplies a high level off-signal Of. The high level off-signal Of causes the control circuit 1 to be switched in the off-state immediately. The transition to standby mode is completed as soon as the power supply voltage Vcc reaches the starting level Von. At this moment the signal On1 becomes high, the flip-flop 107 is set and comparator 102 becomes active. In the standby mode, a current is caused through the opto-coupler diode Do by closing switch S4. This current is determined by the resistor Rx as long as the power supply is not regulated. The current is also determined by the zener diode Z1 during a period in which the power supply is in regulation. The related current through the opto-coupler transistor Tro causes the voltage at the input I1 to be so high that the output of comparator 102 changes to a high level and switch 100 opens, switch 101 closes and flip-flop 110 is set. The high mode-indication signal Mi indicates the standby mode, so the standby off-level Voffs is selected. The signal Of has a low level. Comparator 103 supplies a low level as switch 100 is open and the reference voltage Vref3 is kept higher than the voltage at the non-inverting input. It is clear from the foregoing that the opto-coupler Do, Tro is used to transfer information from the secondary to the primary side of the power supply: (a) to stabilize an output voltage of the power supply in the normal operating mode, (b) to indicate that the power supply should alter to the standby mode operation, (c) to indicate that the power supply should stay in the standby mode operation, and (d) to stabilize an output voltage of the power supply during the standby mode, if desired.

A transition from the standby mode to the normal operating mode will now be described.

First, the operation of the circuit shown in FIG. 10 is elucidated in the situation when the control circuit 1 is in the off-state (the power supply voltage Vcc rises) at the moment the standby mode indication signal Vs indicates a change to the normal operating mode. The switch S4 opens and the current through the opto-coupler transistor Tro drops to zero. The power supply voltage Vcc continues to rise until the starting level V-on is reached. Then exactly the same happens as described above at a first start-up to the normal mode.

Secondly, the operation is elucidated if the control circuit 1 is in the on-state (the power supply voltage Vcc is decreasing) at the moment the standby mode indication signal Vs indicates a change to the normal operation mode. The switch S4 opens and the current through the opto-coupler transistor Tro drops to zero. Comparator 102, which is still active, detects a low voltage at the input I1 and supplies a low level mode indication signal Mi. The off-signal Of changes to high level to switch the control circuit into the offstate immediately, due to the low level mode indication signal Mi via inverter 111 and the already set flip-flop 110 (during the standby mode, see above).

It will be evident that possible variants of the embodiments described will be within the scope of the invention. For example, the switch S1 may also be, for example, a bipolar transistor. The opto-coupler may be replaced by other components which can transmit information through a line voltage separation such as, for example a pulse transformer. If a pulse transformer is used, obvious modifications should be realized in the feedback circuit 2a, 2b; 2a, 2b'. If no mains separation is necessary, an auto transformer may be used. The switch S1 may also be a different semiconductor switching element such as a thyristor.

One aspect of the invention may be summarized as follows. In a standby mode, a switched-mode power supply circuit according to the invention, may be operated in a burst mode with reduced secondary voltages Vo1, Vo2 for supplying a standby voltage Vo1 at a very high efficiency. In a normal operating mode of the power supply, a control circuit 1 is maintained in its on-state by means of a power supply voltage Vcc generated by the power supply. The control circuit 1 supplies control pulses Vd for switching the power supply. The burst mode is obtained by decreasing the power supply voltage Vcc generated for the control circuit 1 to such an extent that, without any further provisions, the control circuit 1 reaches an off-state in which no control pulses Vd are generated. In the standby mode, the control circuit 1 is supplied with current by means of power supply means 4. In the off-state, the control circuit 1 takes up a smaller power supply current Icc from the power supply means 4 than it is supplying and the power supply voltage Vcc increases until the control circuit 1 reaches the on-state and starts generating the control pulses Vd. In the on-state, the control circuit 1 takes up a larger current from the power supply means 4 than it is supplying and the power supply voltage Vcc decreases until the control circuit 1 reaches the off-state again. In this way, the power supply, in the standby mode, is each time active during first periods and inactive during second periods. To bring the power supply voltage to the standby mode, the power supply voltage Vcc generated for the control circuit 1 is decreased in such a way that also the secondary voltages Vs1, Vs2 are decreased.

It is to be noted that the embodiments described hereinbefore elucidate rather than limit the invention and that those skilled in the art will be capable of conceiving many alternative embodiments without passing beyond the protective scope of the claims. Reference signs between brackets incorporated in the claims should not be explained as a limitation of these claims. The invention, and notably control circuit 1, may be implemented in hardware with different elements, and/or by means of a suitably programmed processor, with both implementations being within the scope of the invention.

What is claimed is:

1. A switched-mode power supply circuit adapted to operate in a normal operating mode and a standby mode, said switched-mode power supply circuit comprising:

a switch;

a control circuit for controlling the switch, said control circuit comprising a voltage-detection means coupled to receive a power supply voltage for bringing the control circuit to an off-state if the power supply voltage has decreased to an off-level, and for bringing the control circuit to an on-state if the power supply voltage has increased to a starting level;

a transformer having a primary winding and being incorporated in a series arrangement with the switch, said series arrangement being coupled to a DC input voltage source, the transformer further having a power supply winding coupled to the voltage-detection means, the power supply winding supplying a take-over voltage in the normal operating mode at a value at which the control circuit is in the on-state; and power supply means coupled to the DC input voltage source for receiving an input current for applying a power supply current to the control circuit; characterized in that the switched-mode power supply circuit further comprises means for decreasing the take-over voltage in the standby mode and, in response to a standby mode indication signal, to a value at which the control circuit may be alternately in the on-state and in the off-state.

2. A switched-mode power supply circuit as claimed in claim 1, characterized in that the transformer further has a first and a second secondary winding for supplying a standby voltage and an operating voltage, respectively, in the operating mode, and the switched-mode power supply circuit further comprises connection means activatable by the standby mode indication signal, said connection means conducting a current from the second secondary winding to the first secondary winding in the standby mode.

3. A switched-mode power supply circuit as claimed in claim 2, characterized in that the means for decreasing the take-over voltage comprises:

said connection means; and a voltage-clamping circuit coupled to the first secondary winding for limiting the standby voltage.

4. A switched-mode power supply circuit as claimed in claim 3, characterized in that the switched-mode power supply circuit further comprises:

a pulse control circuit having an output coupled to a control input of the switch for supplying control pulses to the switch; and feedback means coupled to receive a feedback voltage related to the standby voltage for supplying an active feedback signal to the control circuit in the standby mode if the feedback voltage reaches a maximum level, the control circuit influencing the control pulses after receiving the active feedback signal to ensure that the standby voltage does not further increase.

5. A switched-mode power supply circuit as claimed in claim 4, characterized in that the control circuit further comprises a detection circuit having a detection input for receiving the feedback signal, the detection circuit being coupled to the pulse control circuit for discontinuing the generation of the control pulses for maintaining the switch open after the feedback signal has become active.

6. A switched-mode power supply circuit as claimed in claim 4, characterized in that the control circuit further comprises a stabilizing control circuit having a control input for receiving the feedback signal, and an output for supplying a control signal to the pulse control circuit for stabilizing the standby voltage after the feedback signal has become active.

7. A switched-mode power supply circuit as claimed in claim 2, characterized in that the switched-mode power supply circuit further comprises:

a pulse control circuit having an output coupled to a control input of the switch for supplying control pulses to the switch; and feedback means coupled to receive a feedback voltage related to the standby voltage for supplying an active feedback signal to the control circuit in the standby mode if the feedback voltage reaches a maximum level, the control circuit influencing the control pulses after receiving the active feedback signal to ensure that the standby voltage does not further increase.

8. A switched-mode power supply circuit as claimed in claim 7, characterized in that the control circuit further comprises a detection circuit having a detection input for receiving the feedback signal, the detection circuit being coupled to the pulse control circuit for discontinuing the generation of the control pulses for maintaining the switch open after the feedback signal has become active.

9. A switched-mode power supply circuit as claimed in claim 7, characterized in that the control circuit further comprises a stabilizing control circuit having a control input for receiving the feedback signal, and an output for supplying a control signal to the pulse control circuit for stabilizing the standby voltage after the feedback signal has become active.

10. A switched-mode power supply circuit as claimed in claim 2, characterized in that the switched-mode power supply circuit further comprises current-limiting means for limiting the current through the connection means.

11. A switched-mode power supply circuit as claimed in claim 10, characterized in that the current-limiting means comprises a resistor arranged in series with the connection means.

12. A switched-mode power supply circuit as claimed in claim 10, characterized in that the current-limiting means comprises:

an off-circuit having an input for receiving the standby mode indication signal and an output coupled to the control circuit for causing the generation of control pulses to stop in response to the standby mode indication signal until the power supply voltage has reached the off-level; and soft-start means provided in the control circuit for influencing an on and off-time of the control pulses for starting the power supply circuit at a small peak current in the primary winding after the power supply voltage has reached the starting level.

13. A switched-mode power supply circuit as claimed in claim 1, characterized in that the power supply means comprises:

a resistor coupled between the power supply voltage input and a junction point of a terminal of the DC input voltage source and the primary winding; and a capacitor coupled between the power supply voltage input and another terminal of the DC input voltage source.

14. A switched-mode power supply circuit as claimed in claim 1, characterized in that the voltage-detection means is adapted to decrease a difference between the starting level and the off-level during the standby mode.

15. A switched-mode power supply circuit as claimed in claim 1, characterized in that the voltage-detection means comprises decision means for bringing the control circuit to the off-state in response to a change of the standby mode indication signal indicating a change of mode of the switched-mode power supply circuit.

16. A switched-mode power supply circuit as claimed in claim 15, characterized in that a secondary part of the feedback means is adapted to receive the standby mode indication signal, and in that the decision means is coupled to a primary part of the feedback means to detect a change in the feedback signal caused by a change of level of the standby mode indication signal.

17. A switched-mode power supply circuit as claimed in claim 16, characterized in that the secondary part of the feedback means comprises an opto-coupler diode and an off-circuit coupled to receive the standby mode indication signal for generating an additional current through the opto-coupler diode in response to a change of the standby mode indication signal indicating a change from the normal operating mode to the standby mode, and in that the primary part of the feedback means comprises an opto-coupler transistor optically coupled to the opto-coupler diode, the decision means being coupled to receive a current through the opto-coupler transistor for bringing the control circuit to the off-state in response to an additional current through the opto-coupler transistor caused by the additional current through the opto-coupler diode.

18. A switched-mode power supply circuit as claimed in claim 17, characterized in that the decision means is adapted to also bring the control circuit into the off-state if the additional current through the opto-coupler diode is switched off in response to the standby mode indication signal indicating a change from the standby mode to the normal operating mode.

19. A switched-mode power supply circuit as claimed in claim 1, characterized in that the control circuit further comprises a peak limiter for limiting the peak current through the primary winding of the transformer during the standby mode.

20. A picture display apparatus comprising:

an input circuit for receiving an AC input voltage and for supplying a DC input voltage a switched-mode power supply circuit coupled to receive the DC input voltage for supplying an operating voltage and a standby voltage an addressing circuit coupled to receive the operating voltage for addressing a display unit; and operating means coupled to receive the standby voltage and operating commands, and for supplying a standby mode indication signal, wherein said switched-mode power supply circuit is adapted to operate in a normal operating mode and a standby mode, said switched-mode power supply circuit comprising:

a switch;

a control circuit for controlling the switch, said control circuit comprising a voltage-detection means coupled to receive a power supply voltage for bringing the control circuit to an off-state if the power supply voltage has decreased to an off-level, and for bringing the control circuit to an on-state if the power supply voltage has increased to a starting level;

a transformer having a primary winding and being incorporated in a series arrangement with the switch, said series arrangement being coupled to a DC input voltage source, the transformer further having a power supply winding coupled to the voltage-detection means, the power supply winding supplying a take-over voltage in the normal operating mode at a value at which the control circuit is in the on-state; and power supply means coupled to the DC input voltage source for receiving an input current for applying a power supply current to the control circuit; characterized in that the switched-mode power supply circuit further comprises means for decreasing the take-over voltage in the standby mode and, in response to a standby mode indication signal, to a value at which the control circuit may be alternately in the on-state and in the off-state.

\* \* \* \* \*